Jan. 30, 1968  C. A. POWERS ET AL  3,366,177
PRODUCTION OF PETROLEUM FROM UNCONSOLIDATED FORMATIONS
Filed Aug. 10, 1966  2 Sheets-Sheet 1

WILLIAM G. BEARDEN
CHARLES A. POWERS
  INVENTORS.

BY *Arthur McElroy*

ATTORNEY.

WILLIAM G. BEARDEN
CHARLES A. POWERS
INVENTORS.

ATTORNEY.

United States Patent Office 3,366,177
Patented Jan. 30, 1968

3,366,177
PRODUCTION OF PETROLEUM FROM UNCONSOLIDATED FORMATIONS
Charles A. Powers and William G. Bearden, Tulsa, Okla., assignors to Pan American Petroleum Corporation, Tulsa, Okla., a corporation of Delaware
Filed Aug. 10, 1966, Ser. No. 571,508
9 Claims. (Cl. 166—12)

ABSTRACT OF THE DISCLOSURE

Lumnite clinker, when cured in water and then fired at 800° F. for two days, lost compressive strength when standing in water and especially when standing in oil. To prevent this loss in strength it is proposed to treat the clinker before exposure to oil, with a material to form an oil-insoluble coating on the hydrated cement particles. Water glass is an example.

---

The present invention relates to the production of fluids from loosely consolidated sands. More particularly, it is concerned with a novel improvement in the problem of controlling the flow of sand in hydrocarbon fluids produced either by means of conventional oil wells or by means of wells that are part of a thermal recovery method.

Briefly stated, our invention involves a discovery that the cement clinker in filter screens such as the type described in U.S. 3,244,229 when exposed to oil tends to undergo a substantial reduction in compressive strength, particularly after the screen has been exposed to elevated temperatures. This difficulty we have found can be overcome by coating the set or cured clinker mass with a material that is oil and water insoluble and heat stable. The cement clinker thus treated is capable of retaining a high compressive strength on exposure to oil over long periods of time and still exhibits good permeability.

Sand control in wells producing from unconsolidated formations is a major problem. This is true not only in conventional oil wells producing from unconsolidated zones, such as are found in the Gulf Coast area, but also the matter of sand control remains a serious problem in the recovery of oil from tar sands by thermal methods where high temperatures are encountered in addition to loosely cemented formations.

When a well penetrating an unconsolidated oil producing sand is placed on production, sand erodes from the formation and deposits in the well. The presence of such sand in the well gives rise to a number of operating problems. In fact, they can be sufficiently serious to require abandonment of the well. In other instances this loose sand requires frequent workover jobs in order for the well to operate efficiently. In addition, removal of sand which accumulates in surface equipment such as flow lines, tanks, or separators adds substantially to the cost of production.

Sand filters such as slotted liners or screens have been proposed for the purpose of combatting this problem. Such equipment is usually inserted within the production tubing and placed opposite the producing formation. Packers are used as required to isolate the producing formation and then oil can flow directly from the formation through the liner or screen into the tubing. In spite of these liners or screens, however, sand production still occurs and frequent workover jobs are necessary to maintain satisfactory production.

Gravel packing is still another technique that has been employed in an attempt to solve the sand production problem. In such cases a coarse sand (referred to as gravel) is packed around a wire-wrapped or slotted screen liner. This technique, however, fails to completely prevent sand production and plugging of wells employing this procedure frequently occurs. Such packing appears to be defective, at least in part, for the reason that the gravel tends to shift or move away when packed inplace. Movement of the gravel, in turn, causes the sand back of it to move, working its way through the gravel pack, abrading the liner, and allowing both gravel and sand to enter the well.

In the case of recovering oil from tar sands by means of combustion, we not only have the above-mentioned sand control problems but are, in addition, confronted with the difficulty of providing materials of construction capable of withstanding temperatures of the order of 1500° to 2000° F.

Figure 2:
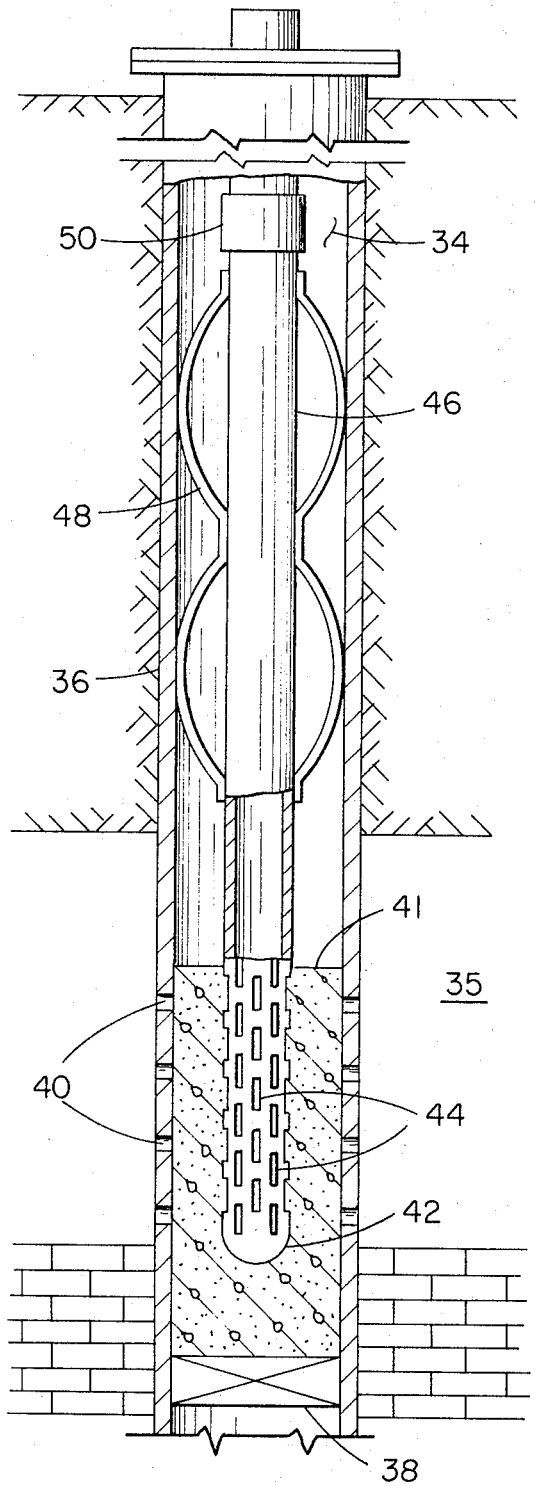
FIGURE 2 is a sectional view showing another variation of the manner in which the ground cement clinker composition of the present invention can be employed to restrain the flow of sand from incompetent formations while at the same time permitting the flow of liquids therefrom.

It is an object of our invention to provide a dependable means of controlling sand flow both in ordinary producing oil wells and in wells producing liquid hydrocarbons from tar sand or similar deposits by thermal methods. It is also an object of our invention to provide a means of placing a porous or permeable pack of a cement clinker opposite a producing zone in a well wherein the components of the pack are more or less locked in position and are coated with a film of high temperature resistant material. It is a further object of our invention to provide a method using cement clinker, coated in accordance with our invention, for completing a well penetrating a number of incompetent or unconsolidated producing zones. It is still a further object of our invention to provide a means by which a single, relatively thick, unconsolidated producing formation can be treated so as to produce hydrocarbon fluids therefrom without the accompanying entrainment of sand. It is another object of our invention to provide a preformed permeable well liner containing as an essential element thereof a layer of coated, permeable cement clinker having a high compressive strength which can be maintained even in contact with well fluids at high temperatures.

In carrying out an embodiment of our invention, we use a ground hydraulic cement clinker prepared from calcium silicate, high alumina cement, or calcium aluminate. The ground material may be placed in position in essentially the same manner as a gravel pack, i.e., introduced in dry form. However, the pack resulting from the use of cement clinker differs markedly from that made of gravel since the particles of clinker in the presence of water, which is ordinarily standing in the well, hydrate and bond to one another at points of contact. After the cement clinker has set, it is treated with a material capable of leaving or forming a high temperature (e.g., 1500° to 2000° F.) resistant film on the surface of the cement particles. Typical examples of such materials are potassium and sodium silicates, saueresin—a liquid porcelain—and the like. In this connection, in the present description and claims, such substances will generally be referred to as a "heat resistant film forming material." This material is displaced down the well either in the form of a solution or as a slurry to contact the set cement clinker. Thereafter a hardened film is formed on the cement by subjecting the resulting mass to a drying operation by the use of an inert gas such as air. The gas employed may be either substantially at formation temperature or, if desired, can be heated to higher temperatures if a shorter treating period is felt necessary. In this way a strong, rigid filter is formed which does not lose its compressive strength on exposure to oil over long periods of time. This filter is capable of preventing sand from entering the well while at the same time allowing fluids to be produced in a normal manner. The increased strength of the resulting filter pack is beneficial for the reason that it lends support to the incompetent formation and thereby prevents movement of the sand grains therein.

As a source of suitable ground material we have found high alumina cement clinker to be particularly effective. The clinker may be converted for use in our invention in a number of different ways. For example, it can be passed through a coarse grinder, then screened to provide the desired particle size distribution. In this regard, tests have shown that high alumina cement (Lumnite—a calcium aluminate cement) clinker ground to a particle size ranging from about $-10$ to about $+40$ mesh, when allowed to set properly, can have a tensile strength in excess of 200 p.s.i., a compressive strength of 1500 p.s.i., and a permeability as high as 60 darcys.

Figure 1:
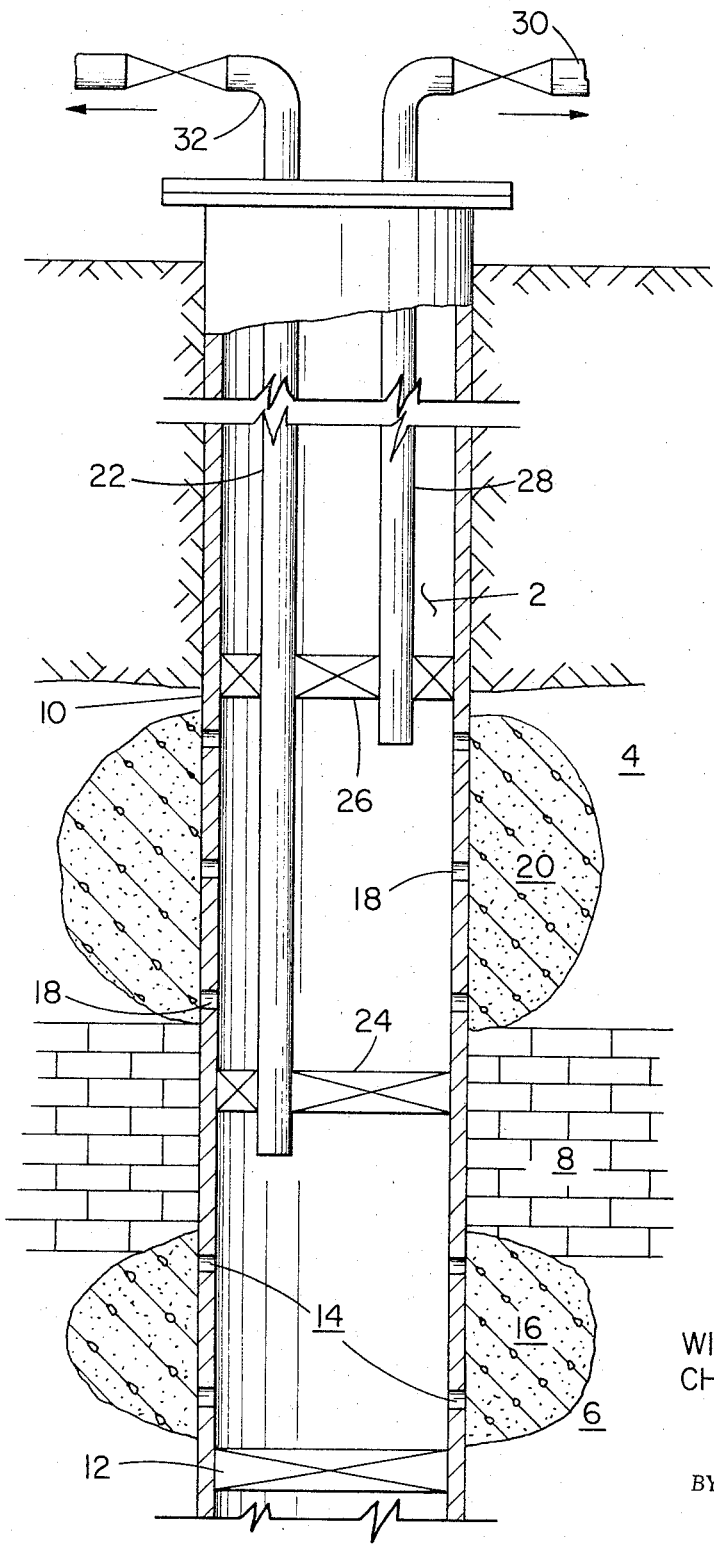
FIGURE 1 is a sectional elevational view of a well producing from two separate zones in which the cement clinker composition of the present invention is deposited behind the casing and opposite the producing zones to restrain sand flow into the well.

Our invention may be further illustrated by reference to FIGURES 1 and 2, showing different applications of the high alumina clinker composition in unconsolidated or incompetent formations. In FIGURE 1, a well 2 penetrates two unconsolidated oil producing formations 4 and 6 separated by an impervious zone 8. Casing 10 extends from the surface down to a level a short distance below unconsolidated zone 6. When casing has been set to the level just mentioned, a suitable bridging plug 12 is placed about even with the lower end of casing 10. However, if casing is run essentially the entire length of the well, no plug need be used. Thereafter, perforations 14 are made and the well placed in communication with formation 6. In some instances, it may be desirable, in order to displace an adequate supply of clinker back of the casing, first to create a cavity back of the casing by washing through perforations 14 and/or 18. A batch of high alumina cement clinker is next displaced down the well and into formation 6 via perforations 14 to contact the incompetent formation over an area comparable to the cross-hatched portion shown as 16. Usually, excess cement remaining in the well after an operation of this sort can be immediately washed out. After the clinker has set the high temperature resistant film forming material is displaced down the well and forced into, for example, clinker pack 16 where the particles thereof become coated with said material. The film is formed on the sand by forcing the liquids in contact therewith into formation 6 by means of air or an equivalent gas causing said material to deposit and harden on the cement surface.

Similarly, opposite formation 4 perforations 18 are made in the casing and temporary bridging plug (not shown) set opposite zone 8. If formations 4 and 6 are close enough, the cement clinker, in slurry form, may be squeezed into said formations in a single operation and the excess material washed or later drilled out before completion.

After the high temperature resistant film is formed as described above on the set clinker pack 20, tubing 22 holding packers 24 and 26 is run into the well and the packers set.

In the embodiment as shown in FIGURE 1, the loose sand in formations 4 and 6 is restrained or controlled by the deposits of cement clinker; and oil, free from objectionable amounts of solids, is produced up the well via tubing strings 28 and 22, respectively, after which it is removed via separate flow lines 30 and 32. The set cement clinker, shown as 16 and 20, may be placed in the well either in the form of dry ground clinker or as an aqueous slurry. Usually, there is enough water present in the well to hydrate the cement if it is placed at the desired level in dry form.

FIGURE 2 shows a well 34 completed in a relatively thick section of unconsolidated oil producing sand 35 in which casing 36 is run into the pay and a plug 38 is set just below the portion of the zone to be produced. Next, perforations 40 are made in the casing over a distance of, for example, 10 to 20 feet, after which a sufficient quantity of a pumpable mixture of high alumina cement clinker is displaced down the well to form a column extending approximately from the lowermost of perforations 40 to about the upper portion of sand 35, or at least above the upper line of perforations. While cement is still soft, a drillable sub 42, e.g., made of a soft metal or plastic, having slots 44 is run in on tubing string 46. Alternatively, the cement may be added after sub 42 is in place. The plastic pipe 42 is held in proper alignment with the well by means of centralizers 48. Once cement pack 41 has set the film forming material is placed down tubing 46 flowing out into the set cement. After a volume of said material corresponding to approximately the pore volume of pack 41 has been displaced therein, air is injected via tubing 46 in slots 44 to form the film on the surfaces of pack 41 in the manner previously described. When the well is placed on production, oil flows from sand 35 via perforations 40 through the permeable cement and into plastic sub 42. There is no movement of sand toward the well beyond perforations 40.

If, for any reason, it is desired to produce from a level below that shown in FIGURE 2, tubing 46 may be separated from sub 42 by means of a back-off or tool joint 50, the tubing pulled and the cemented section, including plastic sub 42 and bridging plug 38, drilled out.

Figure 3:
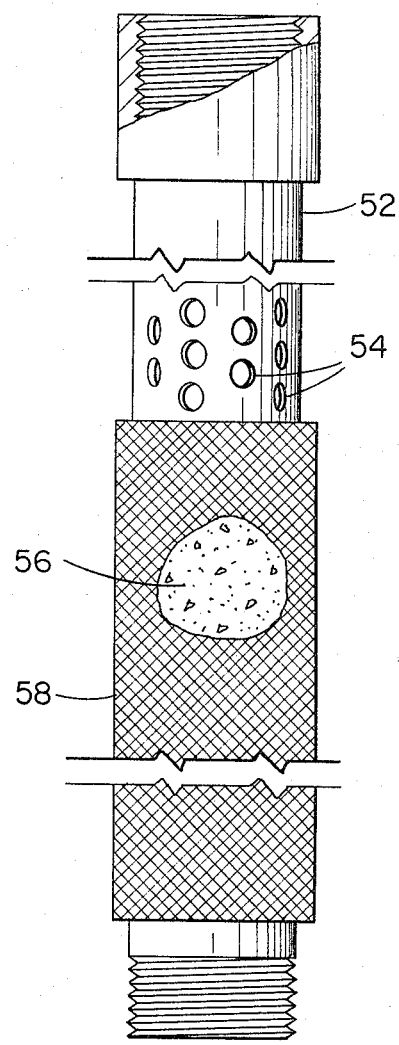
FIGURE 3 is an elevational view partially broken away showing a section of a liner or screen fabricated in accordance with our invention.

FIGURE 3 is representative of one embodiment of a prefabricated liner employing our invention and comprises a section of tubing 52 perforated substantially througout its entire length with drainage holes 54. Surrounding this perforated member is a layer of cement clinker 56 treated in accordance with our invention to impart resistance to the action of oil on the compressive strength of clinker 56. An expanded metal screen 58 is affixed over the entire surface of cement clinker 56 to protect it during installation. If desired, openings 54 may be in the form of slots. Also, between said openings and the layer of cement clinker there may be a layer of Keystone shaped wire, typically 304 stainless steel, wrapped around the tubing and secured thereto by means of welding, employing a spacing of .02 inch between strands of the wire. The threaded ends of the liner permit assembly of any number of sections, depending on the thickness of the unconsolidated formation involved.

Typically, a screen of this kind can be made from 4½ inch O.D. ¼ inch thick Incoloy 800 with ³⁄₁₆ inch holes drilled on half-inch centers. The clinker cement may be put on in layers ranging from about ½ inch to about 1 inch in thickness. The expanded metal shell placed thereover may be from about 5½ inches to 6 inches in diameter.

The actual cement clinker filter element shown in FIGURE 3 as 56 may be prepared by any of several procedures. For example, a suitable cylindrical form having an annulus, typically one to three inches in width, is placed in a vertical position and an aqueous slurry of the ground cement clinker poured into the annular space. Such a form is conveniently made of concentric rolls of thin sheet metal equal in length. The outer roll may be held in place by means of metal straps or the equivalent while the inner member is held in shape by means of metal clamps or internal cross bracing. When the cement has had time to set properly, the metal straps and bracing are removed and the inner and outer metal rolls separated from the newly formed liner. Thereafter the liner is treated with, for example, an aqueous solution of 41° Baumé sodium silicate solution in an amount corresponding to about 1 liner pore volume and then blown dry with air.

In installing these liners, they may be run into the well on tubing and placed opposite the incompetent oil producing zone. Methods for running screens of this kind into a well have been practiced for many years. Typical of such procedures are those described in expired U.S. Patents Nos. 2,154,461 and 2,167,190 as well as 2,205,422.

The advantages afforded by our invention are further illustrated in columns 2 and 3 of the table below with report the results of a series of tests made to establish strength and permeability characteristics of Lumnite cement clinker, for example, −12 to +20 mesh, for use in connection with the manufacture of well liner sand screens. The clinker was tested in the form of 2 inch cubes and placed in water usually for 48 hours to cure at room temperature, i.e., about 75° F. After setting, these cubes were then treated under the various conditions referred to below. The principal objectives of these tests were to determine the effect of oil on the strength and permeability of the clinker screen after firing, i.e., heating in an oven to about 800° F. for 48 to 72 hours. The results are shown in column 2 and demonstrate that the strength of the clinker is reduced substantially on contact with oil after the heating step.

Comparative compressive strength data obtained on the clinker sample cured first in water and then soaked in oil before firing showed that the oil causes a strength reduction of about 35%. After firing, the compressive strength of the clinker first cured in water and then soaked in oil was reduced by approximately 68% compared to that of the initially cured material. The strength reduction is reflected in the higher permeabilities obtained after firing.

In another series of tests, shown in column 3 of the table, two inch cubes of the cement clinker after being cured in water for 48 hours at room temperature were saturated with 41° Baumé sodium silicate solution. The saturation step was effected by flowing 1 cube pore volume of the sodium silicate solution through the clinker and thereafter blowing this material dry with air (100° F.). Next the permeability and compressive strength of the treated clinker were measured after which it was exposed to oil, and permeability and compressive strength observed. The specimens were then heated at 800° F. for a period of 48 hours and exposed to oil following which permeability and compressive strength measurements were again taken.

These data indicate that appreciable permeability reduction can be expected by treatment with a relative concentrated sodium silicate solution but that greater strength is imparted to the clinker by such treatment.

TABLE

| | Plain Clinker | Clinker Treated with Silicate |
|---|---|---|
| After initial curing: | | |
| Permeability to water, darcys | 50 | 28 |
| Compressive Strength, p.s.i | 1,200 | 1,780 |
| After exposure to oil before firing: | | |
| Permeability to oil, darcys | 56 | 28 |
| Compressive Strength, p.s.i | 785 | 1,290 |
| After firing at 800° F. and exposure to oil: | | |
| Permeability to oil, darcys | 71 | 20 |
| Compressive Strength, p.s.i | 390 | 1,155 |

An effort was made to determine whether or not the water curing step could be avoided by attempting to cure the cement clinker in solutions of sodium silicate. However, when the samples were dried and heated to temperatures of 300° F. in some cases and 800° F. in others, it was found that the cubes disintegrated.

As a result of the work described above acceptable permeabilities and high compressive strengths unaffected by oil can be secured by treating the clinker material with a suitable liquid porcelain or alkali metal silicate before said material is subjected to high temperature.

We claim:

1. A method of forming a clinker cement filter pack adjacent an incompetent oil producing zone penetrated by a well wherein said pack does not lose its compressive strength on exposure to oil at temperatures corresponding to those encountered in an underground combustion producing well, the improvement which comprises placing a ground hydraulic cement clinker selected from the group consisting of calcium silicate, calcium aluminate and high alumina cements in contact with the portion of said zone exposed to said well, said clinker having a particle size ranging from about −10 to about +40 mesh, allowing the particles of said clinker to bond together by means of hydration at the point of contact to form a rigid oil-permeable pack, contacting the latter with a volume of heat resistant film forming material sufficient to coat the surfaces of said pack, allowing said material to set, and producing oil from said zone through said pack into said well substantially free from abrasive solids.

2. The method of claim 1 wherein an inert gas is injected through said pack to remove liquid components in contact therewith after said film forming material has coated the surface of said pack.

3. The method of claim 2 in which the cement clinker is employed in the form of a slurry.

4. The method of claim 2 wherein the heat resistant film forming material is selected from the group consisting of alkali metal silicates and liquid porcelain.

5. The method of claim 2 in which said well is cased and said cement clinker is placed in contact with said zone via perforations in said casing opposite said zone.

6. The method of claim 2 wherein said well is a production well employed in an underground combustion process.

7. The method of claim 1 in which the cement clinker employed is derived from a high alumina cement.

8. The method of claim 1 in which the cement clinker employed is derived from calcium aluminate.

9. A method of placing a deposit of cement clinker opposite an incompetent hydrocarbon producing zone penetrated by a well which comprises first forming a cavity about the well bore opposite said zone, next displacing into said cavity a quantity of ground cement clinker selected from the group consisting of calcium silicate, calcium aluminate, and high alumina cements in an amount sufficient to fill said cavity and said well bore surrounded by said cavity, said clinker having a particle size range from about −10 to about +40 mesh, allowing the particles of said clinker to bond together by means of hydration at the points of contact to form a rigid oil-permeable pack in said cavity, contacting said pack with a volume of heat resistant film forming material sufficient to coat the surfaces of said pack, allowing said material to set, drilling through said pack, and thereafter producing hydrocarbons from said zone through said pack and into said well substantially free from abrasive solids.

References Cited

UNITED STATES PATENTS

| | | | |
|---|---|---|---|
| 2,985,238 | 5/1961 | Dixon | 166—15 X |
| 3,219,110 | 11/1965 | Martin et al. | 166—12 |
| 3,244,229 | 4/1966 | Hujsak et al. | 166—12 |
| 3,280,911 | 10/1966 | Strange et al. | 166—228 |
| 3,306,355 | 2/1967 | Maly | 166—29 |

CHARLES E. O'CONNELL, *Primary Examiner.*

I. A. CALVERT, *Assistant Examiner.*

UNITED STATES PATENT OFFICE
CERTIFICATE OF CORRECTION

Patent No. 3,366,177                          January 30, 1968

Charles A. Powers et al.

It is hereby certified that error appears in the above numbered patent requiring correction and that the said Letters Patent should read as corrected below.

Column 2, line 4, for "away" read -- even --; column 4, line 37, for "througout" read -- throughout --; column 5, line 8, for "with" read -- which --.

Signed and sealed this 8th day of April 1969.

(SEAL)
Attest:

Edward M. Fletcher, Jr.

Attesting Officer

EDWARD J. BRENNER

Commissioner of Patents